Figure 1:
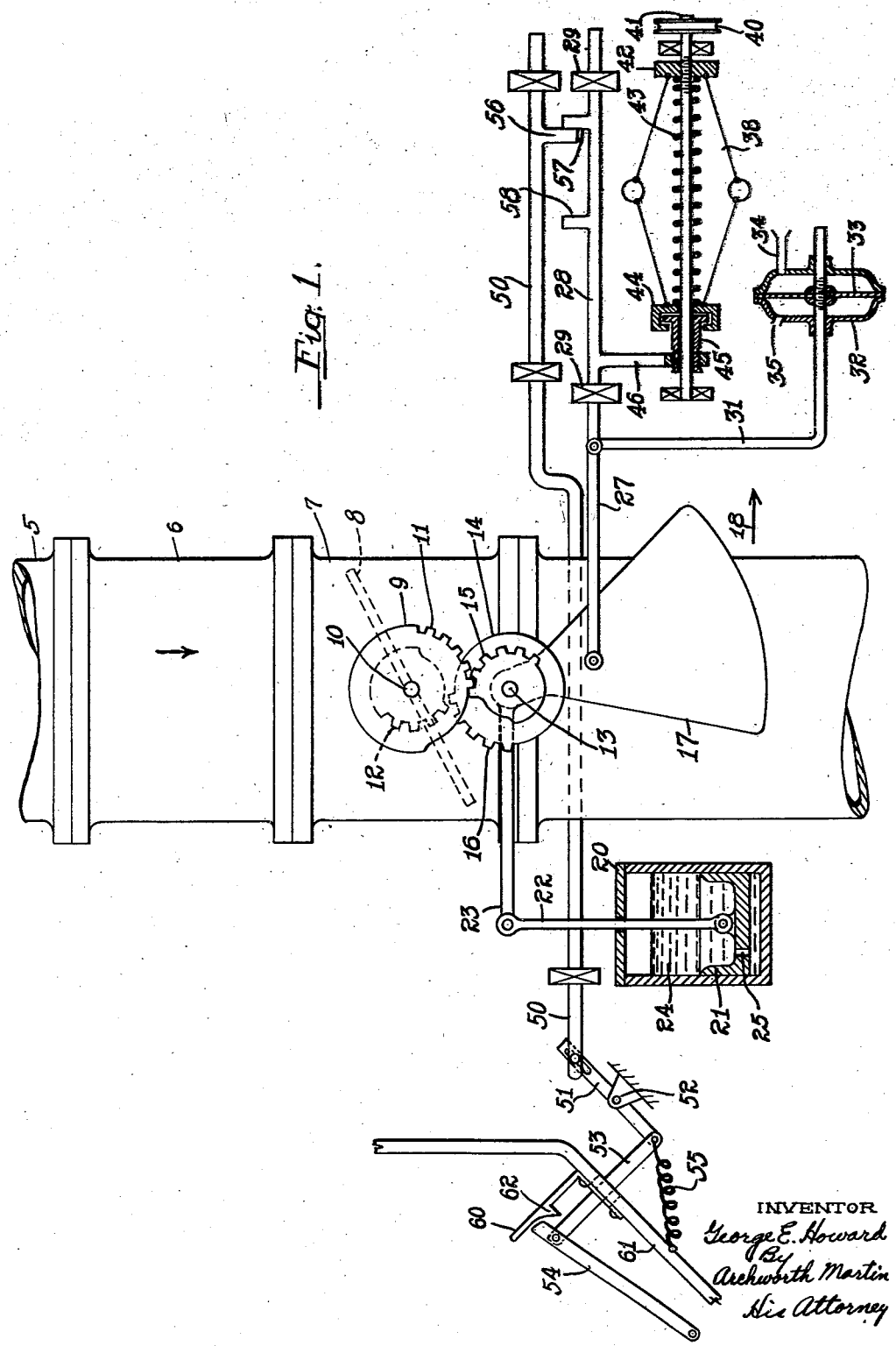

Nov. 17, 1942. G. E. HOWARD 2,302,322
POWER CONTROL FOR ENGINES
Filed Aug. 4, 1941 2 Sheets-Sheet 2

INVENTOR
George E. Howard
By Archworth Martin
His Attorney

Patented Nov. 17, 1942

2,302,322

UNITED STATES PATENT OFFICE 2,302,322

POWER CONTROL FOR ENGINES

George E. Howard, Butler, Pa.

Application August 4, 1941, Serial No. 405,306

10 Claims. (Cl. 180—82.1)

My invention relates to the control of engine speeds and more particularly to the automatic control of the quantity of fuel supplied to internal combustion engines on motor vehicles.

An object of the invention is to provide means for automatically changing the quantity of fuel supply to the engine, in accordance with changes in load conditions such as those arising out of differences in road grades and in wind resistance to the movement of the vehicle.

Another object of my invention is to provide means for so setting the governing device that the engine and consequently the vehicle will maintain a desired speed under changes in load conditions such as those above referred to.

The two main variables of the load or work imposed on an automobile engine are the road grades and wind pressures. The problem of adjusting the fuel supply to an automobile engine so as to maintain a uniform rate of speed at say 40 or 50 miles per hour would be simple if all roads were level and there were no greater air resistance than that resulting from travel of the car in a still atmosphere. Obviously on upgrades and running against the wind, more power is required from the engine to maintain the vehicle at a desired speed, and conversely, less power is required when descending grades or in still air, or in a direction with the wind.

With respect to the matter of the required increase in fuel as greater load conditions are required, the following figures are based on the operation of a typical well-known automobile. At speeds of between 45 and 50 miles per hour, the order of these resistances is approximately as follows: at still air, there may be a variation of from 15 to 18 load horse power, which is mostly wind resistance. Accelerating or decelerating at the rate of one mile per hour for 200 feet of travel amounts to approximately 5 horse power. Elevational or upgrade horse power, however, varies from an increase of 4 horse power required on a one per cent grade at approximately 40 miles per hour to 55 additional horse power required on a 12 per cent grade at 50 M. P. H.

As the ascent or descent of a car on grades presents the greatest variation in horse power required to maintain speed, this furnishes the principal basis for a load-finding device which, with a speed control device, constitutes the best known means for maintaining an even speed with the least fluctuation or variation. However, I herein show and describe means responsive also to conditions of air resistance for affecting the rate of fuel supply. In one example, the head wind, for instance, will operate against a diaphragm or piston that has operative connection with the fuel valve. In the other instance, a device movable through changes in the torque of power transmission to the traction wheels has operative connection with the fuel valve to increase or decrease the rate of fuel, in accordance with changes in grades and wind resistance. This torque-operated device will also be brought into action to move the valve when the vehicle moves from a smooth road surface to a rough roadway, and vice versa. A rough surface, of course, requires more power than a smooth road surface.

While usually the load-responsive elements referred to will be sufficient to automatically regulate the fuel required for maintaining a desired engine speed under changing load conditions, occasionally a condition will arise where these regulating devices will not prevent overspeeding of the engine, and to this end I have provided speed-responsive devices that operate in direct relation to engine speed, for restricting the rate of fuel supply when the engine speed becomes too great.

The pendulum weight, wind resistance acting on the diaphragm and the torque device do not directly control engine power. They do control fuel input. Power is dependent on the efficiency of conversion of this fuel into work. That varies, as for example, 8 cylinders may be filled with the proper amount of mixture to maintain power to balance load resistance, but a spark plug "missing" in one cylinder would result in only seven-eighths of the full power. As the load depends somewhat upon the road surface, a rough surface and a smooth surface would vary the load and cause change of speed with the weight device at a given position. There are load-responsive devices which would approximate the loads, but the speed would vary too much for satisfactory control. Therefore I employ the speed-responsive device in cooperation with the load change elements.

Figure 2:
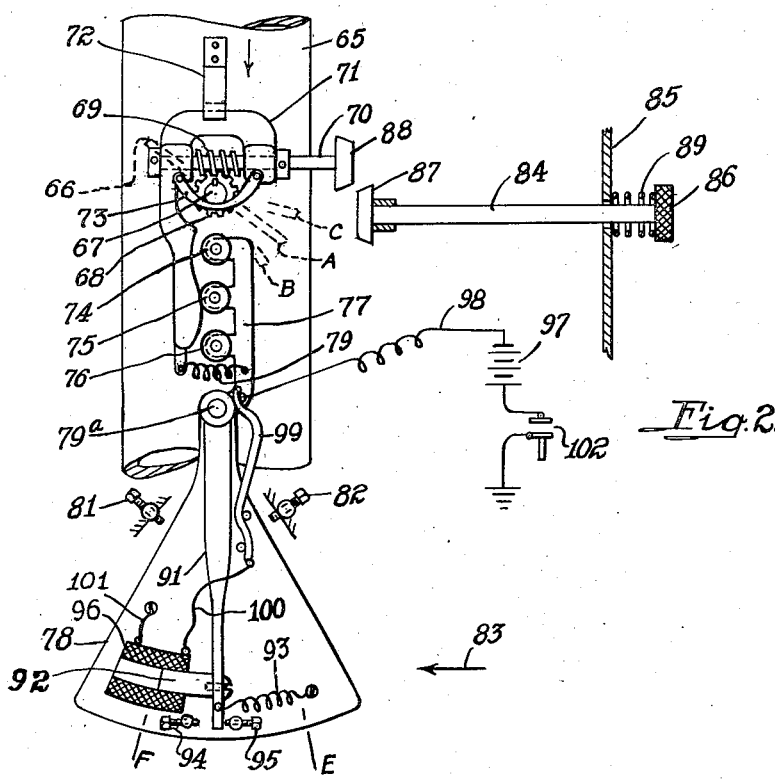
Figure 3:
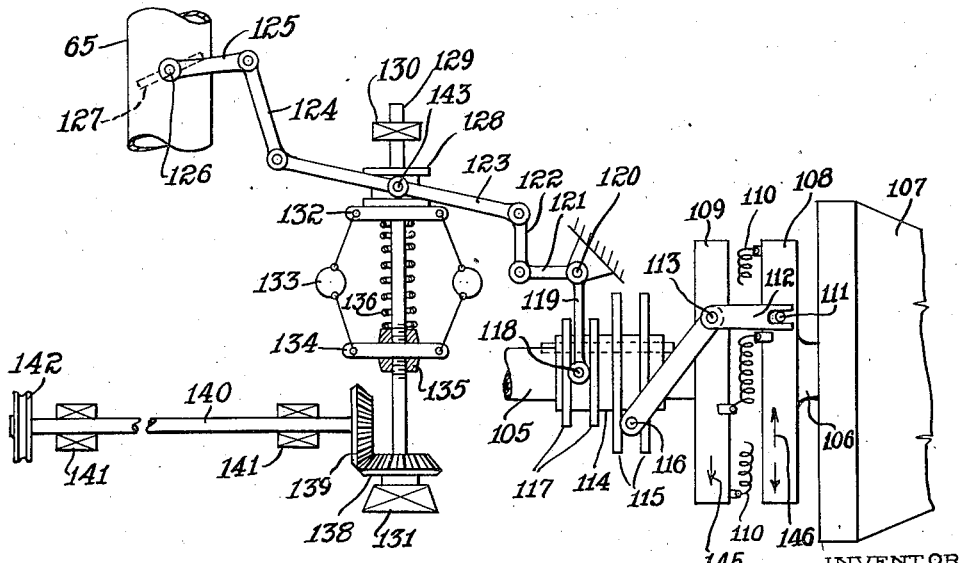

As shown in the accompanying drawings, Figure 1 shows a means for automatically varying the rate of fuel supply directly in accordance with changes in road grade and wind resistance; Fig. 2 shows a modification of the structure of Fig. 1, and Fig. 3 shows a further arrangement responsive to changes in load conditions such as differences in road grade and wind resistance, particularly with respect to differences in driving torque that result from such changes.

In Fig. 1 I show means for supplying fuel to an engine, comprising a carburetor 5 and an intake passage 6 leading to the intake manifold of an engine (not shown). A valve block 7 is incorporated in the fuel line 6 at a point between the carburetor and the intake manifold and contains a butterfly valve 8 of conventional form. A hub 9 is mounted on a projecting end of the shaft 10 that carries the valve 8 and has two sets of segmental gear teeth 11 and 12, formed on large and small radii respectively. A second shaft 13 is supported in the walls of the passage and carries a hub 14 on which are formed gear teeth 15 that mesh with the gear teeth 11, and gear teeth 16 that will mesh with the gear teeth 12, so that as the hub 14 is oscillated as hereinafter explained, such oscillations will be transmitted to the valve 8 to effect opening and closing movements thereof.

A pendulum-like weight 17 is rigidly connected with the hub 14 so that when the weight swings under action of gravity, the valve 8 will be rocked. Assuming the vehicle to be traveling downgrade, in the direction indicated by the arrow 18, the weight will swing toward the position shown on the drawings, wherein its center of gravity is forwardly of a vertical line drawn through the axes of shafts 10 and 13. Therefore, the valve 8 will have been moved toward its closed position with consequent reduction in rate of fuel supply. Conversely in ascending a hill the weight 17 will swing in a clockwise direction, thus opening the valve to admit the increased fuel required for this heavier load. Since, when the throttle valve 8 is adjacent to its closed position a smaller angularity of movement thereof is required to produce a given change in rate of fuel supply, and a much greater angular movement is required in order to effect such given change in fuel when the valve is adjacent to its full open position, I provide the segmental gear 15 of small radius and the segmental gear 11 of relatively large radius, so that there will not be too great movement of valve in a range adjacent to its closed position, relative to the distance which the weight 17 moves. So that the valve will have greater angular movement relative to the weight 17, in a range adjacent to its full open position, I provide the segmental gear teeth 16 of large radius relative the radius of the gear teeth 12, the gear teeth 16 and 12 coming into mesh with one another when the gear teeth 15 pass out of engagement with the gear teeth 11.

A dash-pot 20 is provided for damping the movements of the weight 17. The dash-pot contains a perforated piston 21 connected through a link 22 with a crank arm 23 that is rigidly connected with the weight 17. A body 24 of oil or other suitable fluid is provided in the dash-pot and will move through the orifice 25 in the piston to permit the weight 17 to move through changes in road grade, but excessive vibrations thereof will be prevented.

A link 27 has pivotal connection with the weight 17 and with a slide bar 28 that is slidably supported in bearings 29. An angularly bent bar 31 has connection with the link 27 and the slide bar 28 and extends through a diaphragm casing 32. The bar 31 is slidably supported in the walls of the casing 32 and has connection with a diaphragm 33, so that when the diaphragm is moved, the bar 31 and the weight 17 will likewise be moved.

A forwardly-projecting air scoop 34 extends into the casing so that when the car is traveling against the wind or at a high rate of speed in calm air, air pressure will be transmitted through the scoop 34 to the diaphragm, thus exerting a force that tends to move the weight 17 in a direction to effect an opening movement of the valve 8, to thereby provide the required increase in fuel supply for maintaining vehicle speed. There is a breathing opening 35 in the rear part of the casing 32. Moving at 50 miles per hour, in calm air, there will be a pressure of about 12.25 lbs. per square foot of diaphragm area. With a tail wind, the pressure on the diaphragm will be low and, of course, less power will be needed.

Various forms of speed governors can be employed in connection with the weight and the diaphragm, to operate in a manner similar to the combined suction and speed-operated governor shown in my Patent 2,224,600. However, in the present instance, I have shown a centrifugal governor 38 that is responsive purely to changes in engine speed, without regard to changes in load, the governor serving to prevent overspeeding of the engine when conditions are such that the load-operated elements are not fully effective to limit the engine speed to the desired rate.

The centrifugal governor is driven from the crank shaft or some other suitable source of power through a pulley 40 mounted on a shaft 41 that is journaled in suitable bearings. A weight-anchoring element 42 is adjustable on the shaft for varying the expansive force of the spring 43, which, at its other end, seats against a yoke 44 that is slidably mounted on the shaft. The yoke has hooked engagement with a collar 45 in which the shaft 41 rotates. The collar 45 is rigidly connected to an arm 46 carried by the slide bar 28, so that when the engine is turning at a speed sufficiently rapid to effect expansion of the governor weights, the bar 28 will be slid to the right, thus turning the segmental gears in a direction to move the valve 8 toward closed position. When the engine falls below the governed rate of speed, the spring 43 will expand to effect opening movement of the valve 8.

This is similar to the arrangement shown in Fig. 6 of my Patent 2,138,100, and functionally the weight 17 will operate much in the manner of the vacuum cylinder 56 to cooperate with the speed governor. It is quite obvious that other suitable linkages through combinations shown in the above-named patent can be used in much the same manner as the combination shown on the other figures of this patent.

While the governing apparatus above described can be employed to operate only a governed valve, and a separately-operated manually-controlled valve can be provided, operated from a foot pedal, as in my Patent 2,138,100, I have here shown the valve 8 serving both as a governor-operated and a manually-controlled valve operated from a foot pedal.

The manual control means comprises a pull rod 50 slidably supported in suitable bearings and having connection with a lever 51 mounted on a fixed pivot 52 and having connection with a link 53 that is also connected to the pedal 54. A tension spring 55 is provided of sufficient strength to hold the valve 8 open against the expansive force of the spring 43, when the pedal is released. At its forward end, the rod has an arm 56 which cooperates with studs 57 and 58 on the slide bar 28 at certain positions of the pedal 54. When the pedal 54 is depressed, the bar 50 will be pulled rearwardly, carrying with it the arm 56 and permitting the valve 8 to be opened under the expansive force of the spring 43. Complete depression of the pedal will bring the arm 56 into engagement with the stud 58, to positively hold the valve 8 open, when full power is desired free of the governing mechanism.

When it is desired to set the parts so that there will be full automatic control of speed under various changes of load (wind resistance and grade), the pedal will be latched at a partially depressed position, with its arm 56 intermediate the studs 57 and 58, at which position the weight and wind-responsive elements will be free to function. To this end I provide a spring latch 60 secured to the footboard 61 and having a pedal-retaining pawl 62 that will snap over the top of the pedal when the pedal is partially depressed, at which time the car will be driven automatically. Release of the pedal for foot control operation will be effected by the operator pushing the spring latch 60 with his toe, to release the pedal.

In Fig. 2 I show a weight-operated governing device which functions upon changes in road grade, to vary the amount of fuel supplied through the intake passageway that leads from the carburetor to the intake manifold of the engine. This apparatus includes means for conveniently adjusting the relative angularity of the valve and the pendulum weight in order to compensate for differences in quantity of the fuel and change in other conditions such as when encountering a head wind or a tail wind that renders a particular adjustment of the valve unsuitable for maintaining the desired speed at a changed load condition. In this instance I have shown only a single valve in the fuel supply line, but it will be understood that a separate manually-controlled valve may be provided if desired as in my Patent 2,138,100, or that a throttle pedal may be connected to this single valve as in the case of my Patent 2,224,600, or as in Fig. 1 hereof.

The fuel intake passageway is indicated by the numeral 65 and the valve by the numeral 66. The valve is secured to a shaft 67 that also has a worm gear wheel 68 keyed thereto. The gear wheel 68 meshes with a worm 69 whose shaft 70 is journaled in the arms of a yoke 71, so that when the shaft 70 is turned, the angularity of the valve relative to the yoke 71 will be changed. A wing 72 is secured to the member 65 and has its lower end loosely overlying the upper portion of the yoke 71, to serve as a guide and retaining member for the yoke during movements thereof. A strap 73 extends beneath the shaft 67 and has its ends fastened to the yoke, to assist in maintaining the yoke in position.

The longer leg of the yoke has camming surfaces that are engaged by rollers 74, 75 and 76, which are mounted on an upwardly-projecting member 77 that is pivotally supported on a stud 79a which is carried by the pipe 65. A tension spring 79 maintains the yoke in engagement with the rollers. The member 77 has a depending arm 91 formed unitarily therewith. The weight 78 is pivoted on the stud 79a and when the weight rocks through changes in road grade, the arm 91 and hence the valve 66 will also be rocked. Threaded stops 81 and 82 are provided for adjustably limiting the range of swinging movements of the weight relative to the arm 91.

Usually the valve 66, when at about the position marked A, will permit fuel flow in sufficient volume to move the vehicle at a desired governed speed, with the vehicle traveling on a level road. The exact position required for the valve under such condition will be arrived at by turning the shaft 70 to open the valve the proper distance, when the weight is at exactly its mid position, with its center of gravity directly beneath the axis of the shaft 67.

If now, with the vehicle traveling in the direction indicated by the arrow 83, an upgrade is encountered, the weight will swing in a counterclockwise direction, tending to move the roller 75 in a direction toward the yoke, and the valve 66 will be moved toward the position B, until eventually the roller 74 will engage the yoke arm. Added power will thus be supplied in accordance with the greater power required for maintaining speed when going uphill.

Contrariwise, when descending a hill, the weight 78 will swing in a clockwise direction, to swing the yoke 71 and the valve 66 in a counterclockwise direction, thus restricting the fuel supply, until the valve perhaps reaches the position C. The center line through the center of gravity of the weight at this time is approximately F. The opposite extreme position of the weight is indicated generally by the letter E.

The positioning of the rollers 74, 75 and 76 and the arrangement of the camming surfaces on the yoke 71 are such that there will be less angular movement of the valve 66 relative to the range of movement of the weight when the valve nears its closed position than when the valve is more widely open, since, as heretofore explained, a butterfly valve will permit a greater difference in flow of fluid for a given angle of movement when near its closed position than it will for a similar angle of movement in a range nearer to its wide open position.

Adjustment of the valve relative to the weight, to accommodate the governor to changes in fuel and load conditions as above referred to, may conveniently be effected by the driver by means of a shaft 84 that extends through the dashboard 85 of the vehicle, and has a knob 86. At its forward end, the shaft has a friction disc 87 for cooperation with a friction disc 88 that is carried by the shaft 70. When the shaft 84 is pushed inwardly against the compression spring 89, the disc 87 will be brought into driving engagement with the disc 88, so that upon turning of the knob 86 the worm will be turned to change the position of the valve 66 relative to the weight 78.

Changes in effectiveness of the weight 78 would sometimes be desirable in order to compensate for load changes such as those arising through differences between head winds and tail winds. To this end I provide an arm 91 that constitutes an extension of the member 77 and hence is loosely supported on the pin 79a. The arm 91 carries an armature core 92 and will ordinarily be held by a spring 93 against an adjustable stop 95, an adjustable stop 94 being provided to limit movement of the arm in the opposite direction. A magnet coil 96 is mounted on the weight 78 and is energized from a battery 97, the circuit being through a conductor wire 98, a conductor arm 99, a conductor wire 100 and a ground wire 101. A switch 102 is provided in the circuit and is operated to close the circuit and energize the coil 96 when the engine speed exceeds a predetermined rate. The switch 102 may be closed by a solenoid which is energized by a generator as in the case of my Patent 2,224,600, or operated by a centrifugal governor. The circuit may also be through a rheostat on the dash-board, to provide for adjustments, as in my said patent. The purpose of the magnet 96 is to shift the angular position of the weight 78 relative to the throttle valve 66, when the engine speed exceeds the governed rate, so that the valve will be moved to a more nearly closed position than that which it would normally occupy at a given road grade. Thus, when the magnet coil 96 is energized at high engine speed, the arm 91 will be swung clockwise, relative to the weight, thereby causing the valve 66 to be pulled further toward closed position.

Referring now to Fig. 3, I show another form of apparatus for automatically changing the rate of fuel supply in accordance with load requirements. In this device, the fuel regulator, instead of being operated directly by a weight element movable in response to changes in grade, or wind resistance, is actuated indirectly through changes in load conditions as manifested by changes in torque that result from variations in load imposed upon the engine.

The apparatus is shown as incorporated with the engine crank shaft 105 (represented only fragmentarily, for purpose of clearness) which has yieldable connection with a shaft 106 that extends into the usual starter and clutch housing 107. The shaft section 106 has a disc 108 formed on its end and the shaft 105 carries a disc 109. The discs are provided with studs connected by tension springs 110. The springs 110 are of sufficient strength to transmit the full power of the engine from the shaft 105 to the shaft 106, but will yield to an extent dependent upon the load, so that there will at times be some rotative or angular movement of the discs 108 and 109 relative to one another. The disc 108 carries a stud 111 that lies within the forked end of a bell crank lever 112, which is pivotally connected at 113 to the disc 109, so that when there is some slight relative rotative movement of the discs, the lever 112 will be rocked.

A sleeve 114 has splined connection with the shaft 105, so that it will rotate therewith, but is freely slidable thereon. This sleeve has a pair of annular flanges 115 formed thereon, between which projects a pin 116 that is carried by one arm of the bell crank lever 112. It will be seen that as the lever 112 is rocked, the sleeve will be reciprocated longitudinally of the shaft 105. The sleeve also carries a pair of flanges 117 between which extends a stud 118 that is carried by a bell crank lever 119, which is mounted upon a fixed pivot pin 120.

The horizontal leg 121 of the bell crank lever 119 is connected to a link 122 that in turn is connected to a lever 123. The opposite end of the lever 123 is connected with a link 124 whose upper end is pivotally connected to a crank arm 125 that is secured to a shaft 126 which carries a throttle valve 127.

The lever 123 at its mid point is pivotally connected with a collar 128 that is slidable on a governor shaft 129 which is supported at its upper and lower ends in bearings 130 and 131. The collar 128 has rotatable connection with a spider 132 which carries the usual link elements for supporting centrifugal governor weights 133. Those governor weights have link connection also with a spider 134 that is adjustably and rigidly connected at 135 to the shaft 129. The usual expansive spring 136 is interposed between the spiders 132 and 134 to yieldably hold the governor weights in collapsed position. The governor shaft carries a bevel gear wheel 138 which is driven by a bevel gear wheel 139 that is carried on a shaft 140 supported in suitable bearings as at 141. The shaft 140 carries a pulley 142 which will be driven from the crank shaft 105, so that the centrifugal governor will operate in relation to engine speed.

It will be understood that the centrifugal governor serves to limit the engine speed without direct relation to changes in load, since when the engine exceeds the governed speed as determined by the setting of the element 135, the weights 133 will expand, pulling downwardly the collar 128 against the expansive force of the spring 136 and rocking the lever 123 about its pivot point 143, the upper end of the link 122 swinging in a clockwise direction to permit of this movement. This downward movement of the lever 123 pulls the link 124 downwardly and rocks the shaft 126 in a direction to close the valve 127, thus causing a reduction in engine speed.

The torque-responsive mechanism heretofore referred to is provided for moving the throttle valve 127 independently of or supplementarily of the speed governor. For example, the engine may be running at a desired rate of speed, but there may occur a change of load as through change in road grade or wind resistance, so that prompt adjustment of the fuel supply is required in order to avoid any marked change in speed. If, for example, the vehicle is moving along a highway and encounters an upgrade, a greater load will be imposed, which will cause lag of the shaft 106 and its disc 108 relative to the disc 109, so that the lever 112 will be rocked to shift the sleeve 114.

Assuming that the engine shaft 105 and its disc 109 rotate in the direction indicated by the arrow 145, the lag or displacement of the disc 108 will be in the direction of arrow 146, so that the lever 112 will be rocked in a counterclockwise direction to shift the sleeve 114 to the right. This movement of the sleeve will rock the bell crank lever 119 about its pivot 120, thus pulling down the link 122 to rock the lever 123 in a clockwise direction to impose a valve opening thrust movement on the link 124, thereby providing additional power to meet the increased load. Similarly, upon reduction in the load imposed on the shaft 106, and hence reduction in tension on the springs 110, the springs will contract somewhat to move the disc 108 in a direction opposite to that of the arrow 146, thus causing rocking movement of the levers 112 and 119 in a clockwise direction, and rocking the lever 123 in a counter-clockwise direction, to move the valve 127 toward closed position, thereby effecting a reduction of fuel supply in accordance with the decreased load.

I claim as my invention:

1. A governor for controlling the rate of motive fuel supply through an intake passageway to the engine of an automobile or the like, comprising a throttle valve in the passageway, means responsive to changes in load that result from variations in road grades and atmospheric resistance, for moving the valve to control the rate of fuel supply, and a device responsive to engine speeds above a predetermined rate, for additionally moving the said valve.

2. A governor for controlling the rate of motive fuel supply through an intake passageway to the engine of an automobile or the like, comprising a throttle valve in the passageway, a weight shiftable under gravitational force, through changes in road grade, and having operative connection with said valve to move the same, and means responsive to changes in atmospheric resistance, for varying the effectiveness of said weight.

3. A governor for controlling the rate of motive fuel supply through an intake passageway to the engine of an automobile or the like, comprising a throttle valve in the passageway, a weight shiftable under gravitational force, through changes in road grade, and a device responsive to engine speeds above a predetermined rate, for varying the effectiveness of said weight.

4. A governor for controlling the rate of motive fuel supply through an intake passageway to the engine of an automobile or the like, comprising a throttle valve in the passageway, a weight shiftable under gravitational force, through changes in road grade, an operative connection between the valve and the weight, of such form that the valve will be moved a greater distance during one range of angular movement by the weight than during another range of angular movement, means responsive to changes in atmospheric resistance, for varying the effectiveness of said weight, and a device responsive to engine speeds above a predetermined rate, for varying the effectiveness of said weight.

5. A governor for controlling the rate of motive fuel supply through an intake passageway to the engine, of an automobile or the like, comprising a throttle valve in the passageway, means responsive to changes in load that result from variations in atmospheric resistance, for moving the valve to control the rate of fuel supply, and a device responsive to engine speeds above a predetermined rate, for operating the said valve, independently of load changes.

6. A governor for controlling the rate of motive fuel supply through an intake passageway to the engine of an automobile or the like, comprising a throttle valve in the passageway, a weight shiftable under gravitational force, through changes in road grade, and a device responsive to engine speeds above a predetermined rate, for varying the effectiveness of said weight, the said device comprising a centrifugal governor having lost-motion connection with the weight.

7. A governor for controlling the rate of motive fuel supply through an intake passageway to the engine of an automobile or the like, comprising a throttle valve in the passageway, a weight shiftable under gravitational force, through changes in road grade, and a device responsive to engine speeds above a predetermined rate, for varying the effectiveness of said weight, the said device comprising a solenoid which is adapted to be energized upon attainment of a predetermined engine speed.

8. A governor for controlling the rate of motive fuel supply through an intake passageway to the engine of an automobile or the like, comprising a throttle valve in the passageway, a weight mounted for oscillation under gravitational force, through changes in road grade, a device for transmitting motion from the weight to the valve, and means for automatically shifting the point of engagement between said device and the weight, in directions radial to the axis of oscillation, during oscillatory movements of the weight.

9. A governor for controlling the rate of motive fuel supply through an intake passageway to the engine of an automobile or the like, comprising a throttle valve mounted for oscillatory movements in the passageway, a weight shiftable under gravitational force, through changes in road grade, a device for transmitting motion from the weight to the valve, and means for automatically shifting the point of engagement between said device and the valve, in directions radial to the axis of oscillation, during oscillatory movements of the valve by the weight.

10. A governor for controlling the rate of motive fuel supply through an intake pasageway to the engine of an automobile or the like, comprising a throttle valve mounted for oscillatory movements in the passageway, a weight mounted for oscillation under gravitational force, through changes in road grade, a device for transmitting motion from the weight to the valve, and means for automatically shifting the points of engagement by said device with the weight and the valve, in directions radial to the oscillatory axes of the weight and the valve, during oscillatory movements of the weight.

GEORGE E. HOWARD.